United States Patent [19]
Meinhold et al.

[11] Patent Number: 6,156,193
[45] Date of Patent: Dec. 5, 2000

[54] CENTRIFUGAL OIL FILTER WITH PARTICLE RETENTION

[75] Inventors: David R. Meinhold, Metamora; Dwayne E. Tharp, Peoria, both of Ill.

[73] Assignee: Caterpillar Inc., Peoria, Ill.

[21] Appl. No.: 09/237,164

[22] Filed: Jan. 25, 1999

[51] Int. Cl.[7] .............................. B01D 21/26; B04B 9/06
[52] U.S. Cl. ............................ 210/168; 494/49; 494/901
[58] Field of Search ................................ 210/360.1, 297, 210/512.1, 256, 168, 354, 377, 380.1, 378; 494/901, 89, 36

[56] References Cited

U.S. PATENT DOCUMENTS

| | | | |
|---|---|---|---|
| 1,097,561 | 5/1914 | Resines . | |
| 1,795,495 | 3/1931 | Lavett . | |
| 2,350,041 | 5/1944 | Jones . | |
| 2,755,992 | 7/1956 | Tait et al. . | |
| 2,781,130 | 2/1957 | Heckmann et al. . | |
| 2,799,448 | 7/1957 | Lee . | |
| 3,990,631 | 11/1976 | Schall ............................................ | 233/7 |
| 4,284,504 | 8/1981 | Alexander et al. ................... | 210/512.1 |
| 4,346,007 | 8/1982 | Norman et al. ....................... | 210/360.1 |
| 4,647,376 | 3/1987 | Galaj ....................................... | 210/297 |
| 4,687,572 | 8/1987 | Budzich ................................... | 210/114 |
| 4,871,458 | 10/1989 | Purvey .................................... | 210/360.1 |
| 5,227,061 | 7/1993 | Bedsole .................................... | 210/304 |
| 5,484,521 | 1/1996 | Kramer .................................... | 210/86 |
| 5,707,519 | 1/1998 | Miller et al. ............................. | 210/354 |

FOREIGN PATENT DOCUMENTS 511912  1/1955  Italy .

*Primary Examiner*—Duane Smith
*Assistant Examiner*—Frank M. Lawrence
*Attorney, Agent, or Firm*—Howard & Howard

[57] ABSTRACT

A centrifugal oil filter includes a housing having a rotatable bowl disposed in a first fluid chamber and rotatably disposed about a shaft extending through the first fluid chamber. The rotatable bowl has a partition dividing the rotatable bowl into upper and lower portions. A port is formed in the partition so that the fluid flow within the rotatable bowl is directed to a pair of nozzles which act to rotate the rotatable bowl responsive to fluid flow therethrough. The port draws fluid from near the top of the rotatable bowl. Foreign particles are held along the inner wall of the bowl and the top of the partition protecting the particles from the fluid flow within the rotatable bowl.

8 Claims, 2 Drawing Sheets

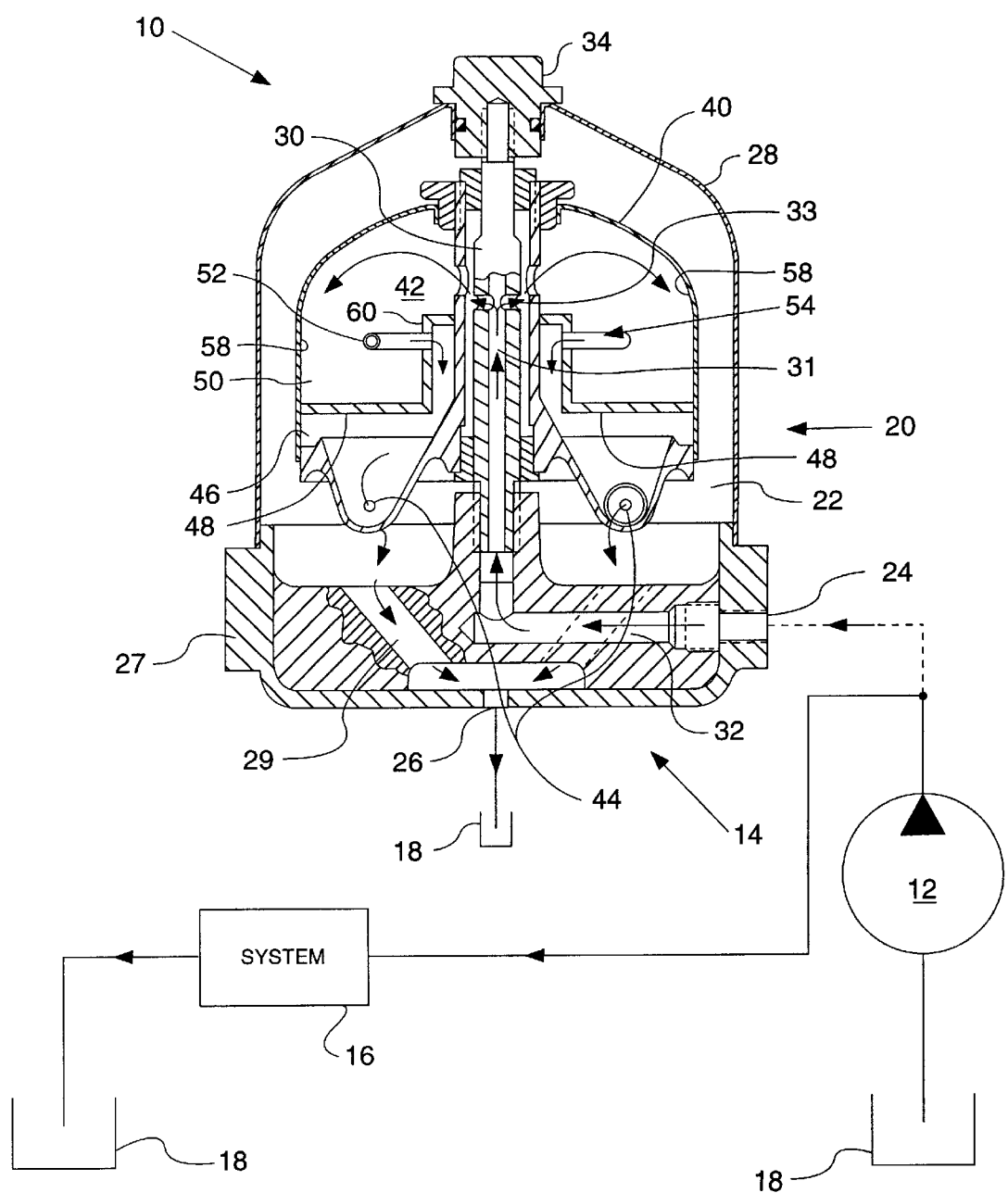

CENTRIFUGAL OIL FILTER WITH PARTICLE RETENTION

TECHNICAL FIELD

The present invention relates generally to a centrifugal oil filter and more particularly to a centrifugal oil filter that has a tube to draw clean oil from a clean oil region.

BACKGROUND ART

Centrifugal oil filters are well known and normally are used to separate particles from the oil by spinning a volume of oil at a high velocity to cause the foreign particles to be forced outwardly against the outer wall of the spinning member. Centrifugal oil filters have been used to separate soot and other very fine particles from the lube oil in engines. In this type of centrifugal oil filter, the soot cakes against the outer wall very tightly and does not have the tendency to separate from the wall and be carried downstream with the "cleaned" oil. When using centrifugal oil filters in oil systems that have other types of foreign particles, such as very fine dirt particles, metal particles, and/or other foreign particles that do not cake tightly together, it is necessary to maintain or flush away the foreign particles so that they do not get carried downstream with the "cleaned" oil. It has been known to provide a particle collection basin at the bottom of a filter to capture the foreign particles. These types of filters rely on gravity to move the foreign particles to the bottom. Many times, the foreign particles do not effectively settle to the bottom due to their size arid/or density. Consequently, some of the foreign particles may be carried downstream with the cleaned oil. It is desirable to provide a centrifugal oil filter that is compact and effective to separate foreign particles from the oil and retain them so that they do not get carried away with the "cleaned" oil.

DISCLOSURE OF THE INVENTION

The present invention provides a centrifugal oil filter for use in a fluid system having a source of fluid flow. The centrifugal oil filter includes a housing having a first fluid chamber defined therein, an inlet port, and an outlet port in fluid communication with the first fluid chamber. A shaft is disposed in the housing and extends through the first fluid chamber and defines a passage therein along a portion of its length with a transverse opening interconnecting the passage with the exterior of the shaft. The passage in the shaft is in open communication with the inlet port of the housing. A rotatable bowl is disposed in the first fluid chamber of the housing and operative to rotate about the shaft.

The rotatable bowl has a second fluid chamber in fluid communication with the passage in the shaft, and diametrically opposed nozzles disposed in the portion of the rotatable bowl and operative to communicate fluid from the second fluid chamber to the first fluid chamber to force the rotatable bowl to rotate.

The second fluid chamber has a partition dividing the second fluid chamber into upper and bottom portions, and at least one port interconnecting the upper portion with the bottom portion. The port is spaced above the partition to draw "clean oil" from near the top of the upper portion to prevent contaminants which are on the outer walls and along the top of the partition from entering the port and flowing into the bottom portion.

BRIEF DESCRIPTION OF THE DRAWINGS

FIG. 2 is a diagrammatic representation of the centrifugal oil filter incorporating another embodiment of the subject invention.

BEST MODE FOR CARRYING OUT THE INVENTION

Figure 1:
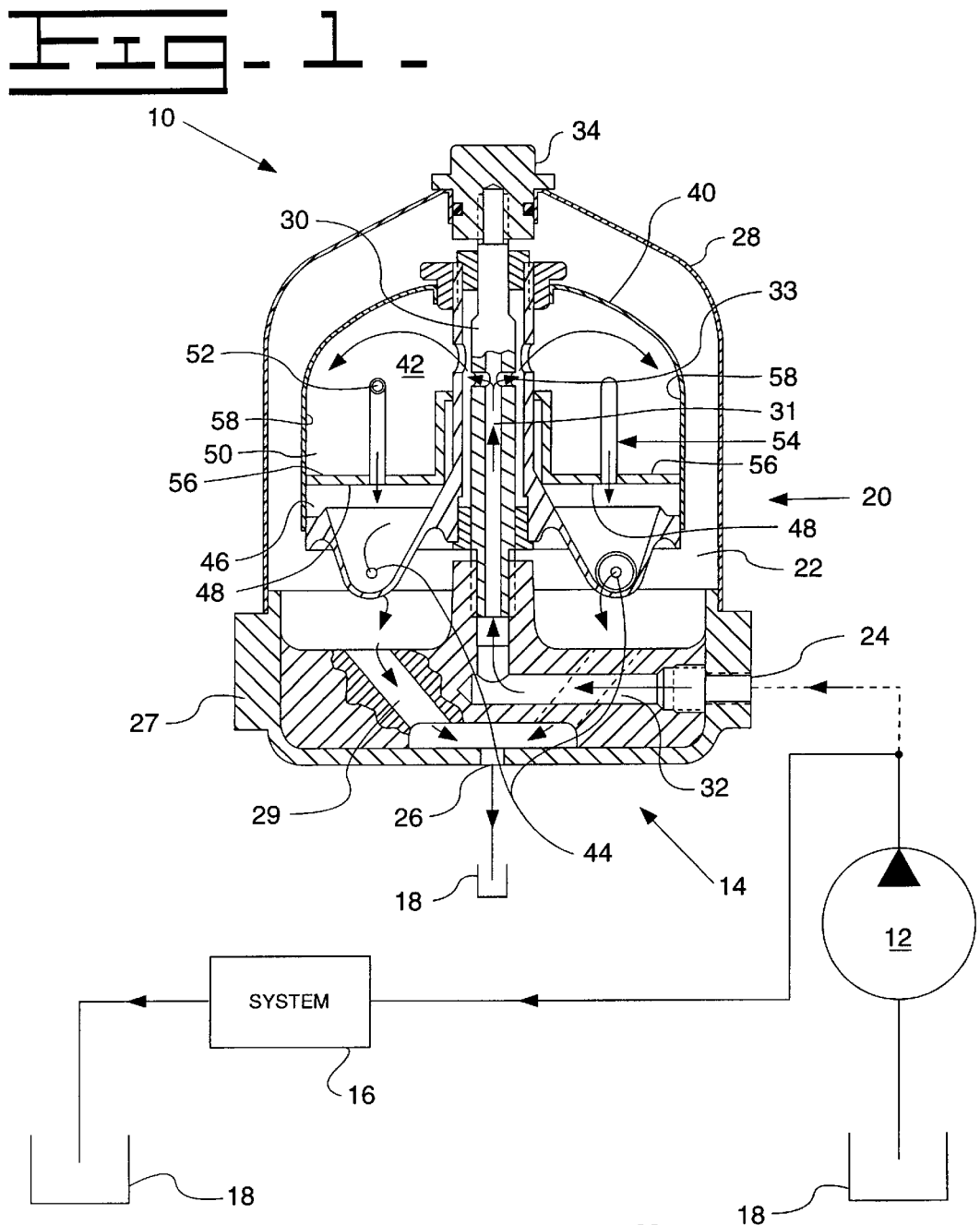
FIG. 1 is a schematic representation of a fluid system that diagrammatically illustrates a centrifugal oil filter incorporating an embodiment of the present invention.

Referring to FIG. 1 of the drawings, a fluid system 10 is illustrated and includes a source of fluid flow, such as a hydraulic pump 12 which directs fluid flow to a fluid circuit 16 and subsequently to a reservoir 18. It is recognized that the centrifugal oil filter 14 could be connected to the fluid system 10 at various locations without departing from the essence of the subject invention. It is also recognized that in systems having small flow rates, the pump could be connected directly to the inlet port 24 and the outlet port 26 could be connected to the fluid circuit 16.

The centrifugal oil filter 14 includes a housing 20 having a first fluid chamber 22 defined therein, an inlet port 24, and an outlet port 26 connected to the first fluid chamber 22. The housing 20 is formed by a base member 27 and a cover 28. The inlet port 24 and the outlet port 26 are both defined in the base member 27. A passage 29 connects the first fluid chamber 22 with the outlet port 26.

A shaft 30 is disposed in the housing 20 between the base member 27 and the cover 28 and extends through the first fluid chamber 22. The shaft 30 has a passage 31 in open communication with the inlet port 24 through a passage 32 and extends along a portion of its longitudinal length. A transverse opening 33 is defined in the shaft 30 and interconnects the passage 31 with the exterior of the shaft 30. A fastening device 34 is secured to the shaft 30 to secure the cover 28 to the base member 27.

A rotatable bowl 40 is disposed in the first fluid chamber 22 of the housing 20 and operative to rotate about the shaft 30. A second fluid chamber 42 is defined in the rotatable bowl 40. A pair of diametrically opposed nozzles 44 are mounted in a bottom portion 46 of the rotatable bowl 40. The pair of diametrically opposed nozzles 44 are operative to cause the rotatable bowl to rotate about the shaft 30 in a well known manner by the reaction force of the fluid passing through the respective nozzles 44.

A partition 48 is mounted in the second fluid chamber 42 to divide the second fluid chamber 42 into an upper portion 50 and bottom portion 46. The partition 48 is fluid impervious. A fluid communication port 54 protrudes from the partition 48 to allow fluid to flow from the upper portion 50 to the bottom portion 46. As illustrated in FIG. 1, the fluid communication port 54 is a hollow tube and extends above the partition 48 and is generally vertical to the shaft 30. The fluid communication port 54 extends into the top of the upper portion 50 to ensure that only clean uncontaminated fluid enters the fluid communication port 54 and flows to the bottom portion 46. Contaminants that may be in the fluid are spaced from the opening 52 of the port 54 and held within the upper portion 50 along the top surface 56 of the partition 48 and the walls 58 of second fluid chamber 42.

In the second embodiment illustrated in FIG. 2, the fluid communication port 54 extends generally horizontally from the shaft 30. The partition 48 extends along the shaft 30 to define an inner wall 60. The port 54 protrudes from the inner wall 60 near the top of the upper portion 50.

Figure 3:
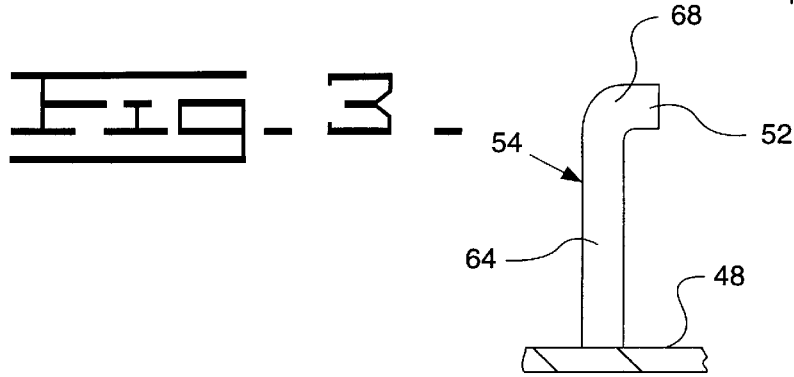
FIG. 3 is a side view of the fluid communication port.

As illustrated in FIG. 3, the fluid communication port 54 of the preferred embodiment has a generally vertical body 64 and a generally horizontal head 68 to facilitate fluid passage into the fluid communication port 54.

It is recognized that various forms of the subject centrifugal oil filter 14 could be utilized without departing from the essence of the subject invention. For example, additional nozzles 44 cold be added to increase the rotational forces applied to the rotatable bowl 40.

INDUSTRIAL APPLICABILITY

During operation, a portion of the fluid flows from the pump 12 into the second fluid chamber 42 of the centrifugal through the inlet port 24, the passage 31 and out the transverse opening 33. The fluid flows through the ports 54 and out the pair of nozzles 44 into the first fluid chamber 22 and out the outlet port 26 to the reservoir 18.

The reaction force of the fluid flowing through the pair of nozzles 44 causes the rotatable bowl 40 to rotate about the shaft 30. Due to the rate of fluid flow across the pair of nozzles 44, the rotatable bowl 40 rotates at a high velocity. During the high rate of rotation the rotatable bowl 44, foreign particles are forced outwardly to the outer wall 58 of the rotatable bowl 40. Due to the weight of the various foreign particles, some of them will fall to the top surface 56 of partition 48 due to gravity. Any of the foreign particles that do not fall during use will remain against the outer wall 58 until the flow through the centrifugal oil filter is substantially reduced or stopped. In this event, the remaining foreign particles settle to the bottom onto the top surface 56 of partition 48. Since the foreign particles are held in or protected by the partition 48, starting the fluid flow through the centrifugal oil filter 14 does not tend to pick up any of the foreign particles and carry them downstream with the cleaned oil. Clean fluid, i.e., fluid above the top surface of the partition 48, is permitted to flow into fluid communication port 54 and enter bottom portion 46 and then nozzles 44.

From a review of the above, it should be apparent that the centrifugal oil filter 14 of the subject invention is effective to separate foreign particles from the oil and retain them within the upper portion 50.

Other aspects, objects and advantages of the invention can be obtained from a study of the drawings, the disclosure and the appended claims.

What is claimed is:

1. A centrifugal oil filter adapted for use in a fluid system having a source of fluid flow, the centrifugal oil filter comprising:

a housing defining a first fluid chamber, an inlet port, and an outlet port in fluid communication with the first fluid chamber;

a shaft disposed in the housing extends through the first fluid chamber, a passage is defined in the shaft along a portion of its length and in open communication with the inlet port, and an opening defined in the shaft to interconnect the passage with the exterior of the shaft;

a rotatable bowl disposed in the first fluid chamber of the housing and operative to rotate about the shaft, the rotatable bowl defining a second fluid chamber in fluid communication with the opening in the shaft, at least one nozzle disposed in the bottom portion of the rotatable bowl and operative to communicate fluid from the second fluid chamber to the first fluid chamber to force the rotatable bowl to rotate, the second fluid chamber having a partition dividing the second fluid chamber into upper and lower portions, and at least one fluid communication port comprising a tube, interconnecting the upper portion with the lower portion, such that fluid in the upper portion can flow to the lower portion through the fluid communication port, the fluid communication port integrally connected to the partition and extending above the partition to draw fluid from near the top of the upper portion to avoid contaminants from entering the fluid communication port and flowing to the lower chamber.

2. The centrifugal oil filter of claim 1, wherein the fluid communication port comprising a tube extends generally parallel to the shaft and terminates at a horizontal head for facilitating fluid passage into the fluid communication port.

3. The centrifugal oil filter of claim 1, wherein the fluid communication port comprising a tube extends generally perpendicular to the shaft.

4. The centrifugal oil filter of claim 1, wherein the partition forms a barrier between the upper and lower portions and is fluid impervious, except for the integrally connected fluid communication port.

5. The centrifugal oil filter of claim 1, wherein the partition extends along the shaft and the tubular fluid communication port extends outwardly from the partition.

6. The centrifugal oil filter of claim 1, wherein the oil filter has two spaced tubular fluid communication ports.

7. The centrifugal oil filter of claim 1, wherein the oil filter includes a pair of diametrically opposed nozzles.

8. A centrifugal oil filter adapted for use in a fluid system having a source of fluid flow, the centrifugal oil filter comprising:

a housing defining a first fluid chamber, an inlet port, and an outlet port in fluid communication with the first fluid chamber;

a shaft disposed in the housing extends through the first fluid chamber, a passage is defined in the shaft along a portion of its length and in open communication with the inlet port, and an opening defined in the shaft to interconnect the passage with the exterior of the shaft;

a rotatable bowl disposed in the first fluid chamber of the housing and operative to rotate about the shaft, the rotatable bowl defining a second fluid chamber in fluid communication with the opening in the shaft, at least one nozzle disposed in the bottom portion of the rotatable bowl and operative to communicate fluid from the second fluid chamber to the first fluid chamber to force the rotatable bowl to rotate, the second fluid chamber having a partition dividing the second fluid chamber into upper and lower portions and at least one fluid communication port comprising a tube, interconnecting the upper portion with the lower portion, such that fluid in the upper portion can flow to the lower portion through the fluid communication port, the fluid communication port integrally connected to the partition and extending outwardly from said partition and extending above the partition to draw fluid from near the top of the upper portion to avoid contaminants from entering the fluid communication port and flowing to the lower chamber;

said at least one fluid communication port comprising a tube extending generally perpendicular in relationship to the shaft.

* * * * *